Patented June 24, 1952

2,601,673

UNITED STATES PATENT OFFICE 2,601,673

SHORTSTOPPING THE ADDITION POLYMERIZATION OF UNSATURATED ORGANIC COMPOUNDS

Frank M. McMillan and Eugene T. Bishop, Berkeley, Calif., assignors to Shell Development Company, Emeryville, Calif., a corporation of Delaware No Drawing. Application April 9, 1951,
Serial No. 220,142

17 Claims. (Cl. 260—84.7)

This invention relates to improvements in the polymerization of unsaturated organic compounds which are capable of undergoing an addition polymerization to form high molecular weight linear polymers. The invention relates more particularly to improved methods for controlled interruption of the polymerization of polymerizable monomers in the polymerization of unsaturated organic compounds capable of undergoing addition polymerization.

In the polymerization of unsaturated compounds which are capable of undergoing an addition polymerization to form high molecular weight linear polymers, the composition of the resulting polymer generally undergoes constant change during its formation. The character of a polymer can thus be varied to some extent by terminating the polymerization short of completion of the conversion of monomer to the polymeric product, and it is, therefore, highly desirable to be able to interrupt the polymerization of the charge undergoing polymerization at any time during the conversion. The discovery of more active catalysts and also of the advantages often inherent in the execution of the polymerization at relatively low temperatures has accentuated the need for means enabling the controlled interruption of the polymerization reaction before complete conversion of monomer to polymer. The obtaining of a polymer of desired character, determined by a degree of incomplete conversion, is generally followed by a separation of unconverted monomer from the reactants in the absence of any further substantial polymerization which would materially alter the properties of the polymeric product. The removal of residual monomer generally entails a plurality of operative steps during which polymeric product, unconverted monomer and catalyst are still in contact with one another for a period of time which will vary in accordance with the degree of separation to be effected. Such processing steps may involve the use of temperature conditions more favorable to the polymerization reaction than the conditions employed up to the time of formation of the polymer of desired character.

Intensive effort has been directed towards the development of a means enabling the more efficient controlled interruption of the polymerization reaction. Certain compounds, for example, furfural, hydroquinone, tetramethylthiuram disulfide, sodium sulfide, p,p'-dihydroxybiphenyl sulfide, and dinitrochlorophenol, termed "stopping agents" or "stoppers," have been disclosed as capable of stopping with varying degrees of success the polymerization reaction short of completion. Of such compounds disclosed heretofore, however, those found to be relatively effective in stopping the polymerization reaction often possess the disadvantage of adversely affecting the properties of the resulting polymeric product. These undesirable effects comprise the incorporation of undesirable odor and/or color to the polymer. Some incorporate constituents exerting undesirable effects upon the physical properties of the polymeric product.

Suitable stopping agents should preferably not only avoid imparting undesirable properties to the polymeric product but should also possess other characteristics such as, for example, absence of tendency to form a coagulum or to corrode equipment when added to the reaction mixture. They should, furthermore, preferably possess the ability to destroy residual catalyst components the presence of which would adversely affect the quality of the polymer. A further essential requirement of a suitable stopping agent is that it be effective in preventing completion of the polymerization of the monomeric components in the reaction mixture at the time the termination of the reaction is desired. Thus, in the execution of an addition polymerization, for example, the copolymerization of an aryl olefin, such as styrene with a diene, the polymer formed will generally have a high ratio of diene component to styrene component during the initial stages of conversion, but upon continuance of the conversion the increment is predominantly polystyrene. Such polymerization of essentially only aryl olefin component towards the latter part of the conversion alters substantially the character of the polymeric product. It is, therefore, desirable that a suitable stopping agent avoid further substantial polymerization of even the more readily polymerized components, in the present instance the aryl olefin component, not only before completion of the polymerization, but also during any subsequent processing comprising, for example, such steps as distillation, flocculation, washing, filtering, drying, and the like, directed to the recovery of the polymer from the reaction mixture.

It is an object of the present invention to provide an improved method enabling the more efficient controlled interruption short of completion of the polymerization reaction in the polymerization of polymerizable monomers in the preparation of synthetic rubber latex.

Another object of the present invention is the provision of an improved method enabling the more efficient controlled interruption short of completion of the polymerization reaction in the polymerization of unsaturated organic compounds which are capable of undergoing an addition polymerization to form high molecular weight linear polymers.

Another object of the invention is the provision of an improved method enabling the more efficient controlled interruption of the polymerization reaction in the production of rubber latices by the emulsion polymerization of polymerizable organic compounds capable of undergoing addition polymerization without imparting detrimental properties to the latex produced.

Still another object of the invention is the provision of an improved method enabling the more efficient controlled interruption short of completion of the polymerization reaction in the production of rubber latices by the copolymerization of a conjugated diene with another polymerizable compound copolymerizable therewith.

A more particular object of the invention is the provision of an improved method enabling the more efficient controlled interruption short of completion of the polymerization reaction in the copolymerization in the form of an emulsion of an aryl olefin with a butadiene. Other objects and advantages of the invention will become apparent from the following detailed description.

It has now been found that the polymerization reaction in the polymerization of unsaturated organic compounds which are capable of undergoing an addition polymerization to form high molecular weight linear polymers can be interrupted short of completion, without adversely affecting to any substantial degree the properties of the desired polymeric product by adding to the reaction mixture undergoing polymerization an unsaturated, hydrogenated pyridine selected from the dihydropyridines, the tetrahydropyridines, and their hydrocarbon substitution products.

Examples of the class of hydropyridines employed as stopping agents for the polymerization of unsaturated organic compounds in accordance with the invention are dihydropyridines, such as 2,3-dihydropyridine, 1,2-dihydropyridine and the alkyl substituted dihydropyridines; the tetrahydropyridines, such as 1,2,3,4-tetrahydropyridine, 1,4,5,6-tetrahydropyridine, and the hydrocarbon substituted tetrahydropyridines, such as 2-methyl-1,4,5,6-tetrahydropyridine
2-phenyl-1,2,3,4-tetrahydropyridine
2,3-dimethyl-1,2,3,4-tetrahydropyridine
2-ethyl-1,4,5,6-tetrahydropyridine
3-ethyl-tetrahydropyridine
2,3-dimethyl-1,4,5,6-tetrahydropyridine
3-ethyl-4-methyl-tetrahydropyridine
1,2,3-trimethyl-1,4,5,6-tetrahydropyridine
2-propyl-1,4,5,6-tetrahydropyridine
2,2,6,6-tetramethyl-1,2,3,6-tetrahydropyridine
1,4,1',4'-tetrahydro-4,4'-pyridyls Particularly suitable stopping agents of the above-defined class of hydropyridines are the derivatives of dihydropyridines represented by the general structural formula

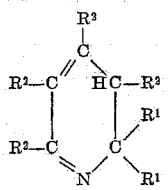

wherein the R$^1$'s and at least two of the R$^2$'s signify hydrocarbon radicals and any remaining R$^2$'s signify hydrogen. However, it has been observed that in certain cases there apparently exists a rapidly attained equilibrium between the 2,3-dihydropyridine nucleus represented in the above formula and the isomeric 1,2-dihydropyridine nucleus represented in the formula

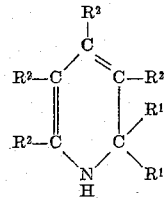

When employed in the present specification and claims, it will be appreciated that these and specific formulae or names derived therefrom are used to refer generically to any of the possible tautomeric isomers resulting from such rapid shifts in the positions of a hydrogen atom and the double bonds.

Dihydropyridines of the above preferred class comprise, for example:

2,2,4,6-tetramethyldihydropyridine
2,2,4,5,6-pentamethyldihydropyridine
2,5,6-trimethyl-2,4-diethyl-dihydropyridine
2-methyl-2,4,6-triethyldihydropyridine
2,2,4,6-tetraethyl-3,5-dimethyldihydropyridine
2,2,3,4,5,6-hexaethyldihydropyridine
2,6-divinyl-2,4-dimethyl-3-methylenedihydropyridine
2,6-diallyl-2,4-dimethyl-3-vinyldihydropyridine
2,6-dimethyl-2,4-diphenyldihydropyridine
2,6-dibenzyl-3-phenyl-2,4 - dimethyldihydropyridines and homologous and analogous compounds. Preferred hydrocarbon substituted dihydropyridines comprise not more than 21 carbons. Particularly preferred are the alkyl substituted dihydropyridines containing a total of at least four separate alkyl substituent groups attached to at least three different carbon atoms of the dihydropyridine ring. Such particularly preferred stopping agents are represented by the compound 2,2,4,6-tetramethylhydropyridine and its homologous and analogous compounds. The preparation of dihydropyridines, suitable as stopping agents in accordance with the present invention, is described and claimed in U. S. Patent 2,516,625. It is to be understood, however, that the present invention is in no wise limited to the use of dihydropyridines and tetrahydropyridines emanating from only a specific source or produced by any specific method of preparation.

In accordance with the present invention the above-defined dihydropyridines and tetrahydropyridines are employed to interrupt the polymerization reaction in the polymerization of those unsaturated organic compounds which undergo addition polymerizations to form high molecular weight linear polymers, by which is meant that a large number of monomer molecules add onto one another to form a large molecule having a predominantly linear structure. Unsaturated organic compounds which undergo such polymerizations generally contain the characteristic structure $CH_2=C<$ and in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Examples of this class of monomers are: the open chain aliphatic conjugated dienes containing at least four carbon atoms, such as, butadiene-1,3 and the homologues and derivatives of butadiene-1,3, as 2,3-dimethylbutadiene-1,3; 2-methyl-1,3-pentadiene; 2-methyl-2,4-pentadiene; isoprene; chloroprene; bromoprene; iodoprene; 2-chlorobutadiene; piperylene; oxy-butadiene; and the like; aryl olefins, such as styrene, substituted styrene as chlorostyrenes, p-methoxy styrene, alpha-methyl-styrene, vinyl naphthalene, and the like; acrylic acid and substituted acrylic acids and their esters, nitriles and amides such as acrylic acid, methacrylic acid, methyl acrylate, ethyl acrylate, isobutyl acrylate, methyl-alpha-chloroacrylate, methyl methacrylate, ethyl methacrylate, butyl methacrylate, ethyl ethacrylate, isoamyl ethacrylate, acrylonitrile, methacrylonitrile, methacrylamide, and the like; methyl isopropenyl ketone, methyl vinyl ketone, methyl vinyl ether, vinyl ethinyl carbinols, vinylidene chloride, vinyl pyridine, vinyl acetate, vinyl chloride, vinyl furane, vinyl carbazole, fumaric acid esters, diallyl maleate, vinyl acetylene, esters, alcohols, acids, ethers, and the like of the type described.

The stopping agents of the present invention are of particular value in the controlled interruption of the polymerization reaction when polymerizing a monomeric material comprising a conjugated diene such as, for example, butadiene 1,3 and homologues and derivatives thereof with one or more other compounds containing the characteristic $CH_2=C<$ group which are copolymerizable therewith such as, for example, the aryl olefins, particularly styrene, acrylic acid and substituted acrylic acids, esters, nitriles and amides, methyl isopropenyl ketone, vinylidene chloride and similar compounds defined above.

The above-defined dihydropyridines and tetrahydropyridines are found to be effective in the controlled interruption of the addition polymerization reaction occurring when the polymerizable monomeric materials are subjected to any of the well-known methods of polymerization. Thus, the polymerization of the above-defined monomeric materials may be carried out in a homogeneous system as by heating the monomeric material with or without a solvent in the presence of suitable catalysts or initiators for the polymerization reaction. The stopping agents of the present invention are of particular value in the controlled interruption of the polymerization reaction short of completion when the polymerization is conducted in a heterogeneous system such as an aqueous emulsion or dispersion. In this type of polymerization the monomeric material is dispersed in a suitable liquid such as water, optionally with the aid of a suitable emulsifying agent, and polymerization is effected by adding the polymerization catalyst or initiator and agitating until the polymer is formed.

It is to be understood that the application of the stopping agents is not limited to their use in polymerization systems conducted under only certain specific conditions and that they are applied broadly within the scope of the invention to the interruption of addition polymerization reactions encountered when effecting the addition polymerization of the monomeric materials under any of the conditions of the addition polymerization systems of the prior art. Temperatures generally employed in the execution of the addition polymerization comprise those in the range of, for example, from about −20° C. up to about 100° C. and higher. In the execution of the polymerization in an emulsified state, suitable emulsifying agents employed comprise any of the conventional emulsifying agents disclosed in the prior art such as, for example, partially or completely neutralized fatty acid soap or soap-like materials such as sodium lauryl sulfate, sodium isobutyl naphthalene sulfonate, and the like. Catalysts employed in the emulsion polymerization comprise those disclosed in the prior art as capable of promoting the addition polymerization of the monomeric materials comprising, for example, the conventional oxygen providing compounds. Any other substances which influence the course of the polymerization or which modify the properties of the polymer obtained as disclosed in the prior art may be present in the mixture undergoing polymerization along with the stopping agents of the present invention without destroying the action of either. Conventional polymerization modifiers such as diaryl disulfides, dialkyl dixanthogens, thiuram disulfides and other organic sulfur-containing compounds which are known to increase the solubility or plasticity of the polymer product may be employed.

Application of the invention to the stopping of addition polymerizations is exemplified by the following: Each of three glass reactors A, B and C is charged with styrene, potassium persulfate catalyst, emulsifying agent Duponol ME (sodium lauryl sulfate), and water in the amounts indicated in the following table. The reactors are thereupon closed and agitated for a period of four hours in a water bath maintained at 60° C. After four hours of agitation the reactors are removed from the bath and the contents flushed with tank nitrogen for 15 seconds. To the contents of two of the reactors, reactors B and C, there is added 2,2,4,6-tetramethyldihydropyridine in the amount indicated in the following table. The three reactors and their contents are then subjected to a second stage of agitation at 60° C. in the water bath for an additional 100 minutes. A total interim time of 45 minutes elapses between the termination of the initial four-hour agitation period and the commencement of the second 100-minute agitation stage. During this interim period residual unconverted styrene in each reactor is determined as well as the polymer yield at the end of the first agitation period. At the end of the 100-minute second agitation period all three reactors are removed from the bath and placed in ice water. When cool, the reactors are opened, water is added to the contents of each, and the resulting aqueous mixture in each reactor is separately distilled under vacuum to distill off unconverted styrene. Styrene distilled off is recovered and weighed and residual polymer is determined. Results obtained in each of the three separate polymerization operations are indicated in the following table:

| Reactor | A | B | C |
| --- | --- | --- | --- |
| Initial charge (parts by wt.): | | | |
| Styrene | 100 | 100 | 100 |
| Water | 300 | 300 | 300 |
| Duponol ME [1] | 0.5 | 0.5 | 0.5 |
| Potassium Persulfate | 0.3 | 0.3 | 0.3 |
| After 4 hrs. agitation at 60° C.: | | | |
| Unreacted styrene | 47 | 47 | 40 |
| Yield of polystyrene, percent [2] | 53 | 53 | 60 |
| 2,2,4,6-Tetramethyldihydropyridine charged (parts per 100 parts by wt. of styrene in initial charge) | none | 1 | 1 |
| After 100 min. additional agitation: | | | |
| Yield of polystyrene, percent | 100 | 70 | 75 |

[1] Sodium lauryl sulfate
[2] Based on unreacted styrene

The presence of 2,2,4,6-tetramethyldihydropyridine imparted no noticeable discoloration or odor to the latex or polymer produced.

The stopping agents of the present invention are of value in interrupting the addition polymerization reaction encountered in polymerization systems conducted at relatively low temperature conditions. Such systems comprise those employed in the production of so-called "cold rubber" by copolymerizing a butadiene with an aryl olefin. Addition polymerizations conducted at temperatures of, for example, below about 50° C. may be conducted in the emulsified system in the presence of a suitable catalyst capable of promoting the addition polymerization of the monomeric materials. Such suitable catalysts comprise, for example, the oxygen-yielding polymerization catalysts such as peroxygen-type catalysts as persalts, e. g., alkali persulfates, alkali perborates, alkali percarbonates, hydrogen peroxide, organic peroxides, e. g., acyl peroxides such as diacetyl peroxides, dibenzoyl peroxides, acetyl benzoyl peroxide, and alkyl peroxides such as tertiary-butyl hydroperoxide, and the like. The persulfates and hydrogen peroxide are generally preferred. Other suitable polymerization systems in which the stopping agents of the present invention are employed with advantage comprise those executed in the presence of compounds identified in the literature as compounds of the "redox system" which consist essentially of materials possessing both oxidizing and reducing characteristics.

When polymerizations are conducted at low temperatures, conventional precautionary measures are taken to avoid the freezing of the reaction mixture or portions thereof. Expedients employed comprise, for example, the addition of an antifreeze to the reaction mixture. The emulsion polymerization may, furthermore, be conducted in substantially non-aqueous medium.

The amount of the above-defined stopping agents, or mixture of such agents, added to interrupt the addition polymerization reaction is not critical. A particular advantage of the stopping agents of the present invention resides in their affinity for oxygen thereby not only destroying the effectiveness of the catalyst as a polymerization promoter, but also obviating detrimental effects upon the polymeric product often directly attributable to residual oxidizing material. It is, therefore, at times desirable to add the stopping agent, or mixture of such agents, in an amount exceeding that necessary to stop the polymerization reaction. The presence of such additional amounts of the hydropyridine stopping agents appears to have no undesirable effects upon the polymeric product finally obtained. In general, it has been found that the addition of the stopping agents of the present invention in an amount ranging from about 0.001 to about 2, and preferably from about 0.01 to about 1% by weight of the monomeric charge is satisfactory. The use of greater or lesser amounts of the stopping agents may, however, be employed within the scope of the invention.

The stopping agents of the present invention may be added at any time during the execution of the polymerization reaction or during the processing steps used in the recovery of the polymer from the reaction mixture comprising polymer, unconverted monomer and catalyst. The particular time at which the stopping agent, or agents, are added will depend to some extent upon the specific monomeric charge being polymerized, the conditions employed and the specific characteristics desired in the polymeric product. In general, the stopping agents are added when a conversion of monomeric material to polymer of from about 50% to about 95% has been attained. In general, it is preferred to effect the addition of the stopping agent before removal of unconverted monomer from the reaction mixture. This is particularly so when the addition polymerization is executed at relatively low temperatures.

The invention claimed is:

1. In the polymerization of styrene in the form of an aqueous emulsion, the step of adding to the emulsion and in the presence of a peroxygen polymerization catalyst 0.001 to 2 parts by weight of 2,2,4,6 - tetramethyldihydropyridine per 100 parts by weight of styrene originally present in the emulsion after polymerization of styrene in the emulsion to polystyrene and while said emulsion still contains unconverted styrene.

2. In polymerizing in the form of an emulsion and in the presence of a peroxygen polymerization catalyst polymerizable monomeric material consisting essentially of styrene, the step of adding to said emulsion 0.001 to 2 parts by weight of a hydrocarbon-substituted dihydropyridine wherein the hydrocarbon substituents are linked by carbon-to-carbon linkage to a nuclear carbon atom of the dihydropyridine nucleus per 100 parts of said polymerizable monomeric material originally present in said emulsion after polymerization of said polymerizable monomeric material to polymer and while said emulsion still contains unreacted polymerizable monomeric material.

3. The improvement in polymerizing polymerizable monomeric material consisting essentially of styrene in accordance with claim 2 wherein said hydrocarbon-substituted dihydropyridine is an alkyl-substituted dihydropyridine wherein the alkyl substituents are linked directly to a nuclear carbon atom of the dihydropyridine nucleus.

4. The improvement in polymerizing polymerizable monomeric material consisting essentially of styrene in accordance with claim 2 wherein said hydrocarbon-substituted dihydropyridine is an alkyl-substituted dihydropyridine containing at least four separate alkyl substituent groups directly attached to at least three different carbon atoms of the dihydropyridine ring.

5. In polymerizing in the form of an aqueous emulsion and in the presence of a peroxygen polymerization catalyst polymerizable monomeric material consisting essentially of a mixture of styrene and butadiene-1,3, the step of adding to said emulsion 0.001 to 2 parts by weight of 2,2,4,6-tetramethyldihydropyridine per 100 parts by weight of said polymerizable monomeric material originally present in said emulsion after polymerization of polymerizable monomeric material in said emulsion to copolymers and while said emulsion still contains unreacted polymerizable monomeric material.

6. In polymerizing in the form of an aqueous emulsion and in the presence of a peroxygen polymerization catalyst polymerizable monomeric material consisting essentially of a mixture of styrene and an aliphatic conjugated diene hydrocarbon, the step of adding to said emulsion 0.001 to 2 parts by weight of a hydrocarbon-substituted dihydropyridine wherein the hydrocarbon substituents are linked by carbonto-carbon linkage to a nuclear carbon atom of the dihydropyridine nucleus per 100 parts of said polymerizable monomeric material originally present in said emulsion after polymerization of polymerizable monomeric material in said emulsion to copolymers and while said emulsion still contains unreacted monomeric material.

7. The improvement in polymerizing in the form of an aqueous emulsion polymerizable monomeric material consisting essentially of a mixture of styrene and an aliphatic conjugated diene hydrocarbon in accordance with claim 6 wherein said hydrocarbon-substituted dihydropyridine is an alkyl-substituted dihydropyridine containing at least four separate alkyl substituent groups directly attached to at least three different carbon atoms of the dihydropyridine ring.

8. The improvement in polymerizing in the form of an aqueous emulsion polymerizable material consisting essentially of a mixture of styrene and an aliphatic conjugated diene hydrocarbon in accordance with claim 6 wherein said hydrocarbon-substituted dihydropyridine is an alkyl-substituted dihydropyridine wherein the alkyl substituents are linked directly to a nuclear carbon atom of the dihydropyridine nucleus.

9. In polymerizing in the form of an emulsion and in the presence of a peroxygen polymerization catalyst polymerizable monomeric material consisting essentially of an aryl olefin, the step of adding to said emulsion 0.001 to 2 parts by weight of a hydrocarbon-substituted dihydropyridine wherein the hydrocarbon substituents are linked by carbon-to-carbon linkage to a nuclear carbon atom of the dihydropyridine nucleus per 100 parts by weight of said polymerizable monomeric material originally present in said emulsion after polymerization of aryl olefin in said emulsion to polymers and while said emulsion still contains unreacted aryl olefin.

10. The improvement in polymerizing in the form of an emulsion polymerizable monomeric material consisting essentially of an aryl olefin in accordance with claim 9 wherein said hydropyridine is 2,2,4,6-tetramethyldihydropyridine.

11. In polymerizing in the form of an emulsion and in the presence of a peroxygen polymerization catalyst polymerizable monomeric material consisting essentially of a mixture of an aryl olefin and a butadiene-1,3, the step of adding to said emulsion 0.001 to 2 parts by weight of 2,2,4,6-tetramethyldihydropyridine per 100 parts by weight of said polymerizable monomeric material originally present in said emulsion after polymerization of polymerizable monomeric material in said emulsion to copolymers and while said emulsion still contains unreacted polymerizable monomeric material.

12. In polymerizing in the form of an emulsion and in the presence of a peroxygen polymerization catalyst polymerizable monomeric material consisting essentially of a mixture of an aryl olefin and an aliphatic conjugated diene hydrocarbon polymerizable therewith, the step of adding to said emulsion 0.001 to 2 parts by weight of a hydropyridine selected from the group consisting of dihydropyridine, tetrahydropyridine, hydrocarbon-substituted dihydropyridine and hydrocarbon-substituted tetrahydropyridine wherein the only carbon linked to the nuclear nitrogen atom of the hydropyridine nucleus is nuclear carbon contained in the hydropyridine nucleus per 100 parts by weight of said polymerizable monomeric material originally present in said emulsion after polymerization of polymerizable monomeric material in said emulsion to copolymers and while said emulsion still contains unreacted polymerizable monomeric material.

13. In polymerizing in the form of an aqueous emulsion and in the presence of a peroxygen polymerization catalyst polymerizable monomeric material selected from the group consisting of butadienes-1,3 and mixtures of butadienes-1,3 with an aryl olefin, the step of adding to said emulsion 0.001 to 2 parts by weight of 2,2,4,6 - tetramethyldihydropyridine per 100 parts of said polymerizable monomeric material originally present in said emulsion after polymerization of polymerizable monomeric material in said emulsion to polymer and while said emulsion still contains unreacted polymerizable monomeric material.

14. In polymerizing in the form of an aqueous emulsion and in the presence of a peroxygen polymerization catalyst polymerizable monomeric material selected from the group consisting of butadienes-1,3 and mixtures of butadienes-1,3 with an unsaturated organic compound which contains a $CH_2=C<$ group and which undergoes in aqueous emulsion addition polymerization to form high molecular weight linear polymer, the step of adding to said emulsion 0.001 to 2 parts by weight of a hydrocarbon-substituted dihydropyridine wherein the hydrocarbon substituents are linked by carbon-to-carbon linkage to a nuclear carbon atom of the dihydropyridine nucleus per 100 parts by weight of said polymerizable monomeric material originally present in said emulsion after polymerization of polymerizable monomeric material in said emulsion to polymers and while said emulsion still contains unreacted polymerizable monomeric material.

15. The improvement in polymerizing in the form of an aqueous emulsion polymerizable monomeric material selected from the group consisting of butadienes-1,3 and mixtures of butadienes-1,3, with an unsaturated organic compound which contains a $CH_2=C<$ group and which undergoes in aqueous emulsion addition polymerization to form high molecular weight linear polymer in accordance with claim 14 wherein said hydropyridine is 2,2,4,6 - tetramethyldihydropyridine.

16. In the addition polymerization in the presence of a peroxygen polymerization catalyst of a polymerizable monomeric material consisting essentially of a polymerizable unsaturated organic compound which contains a $CH_2=C<$ group and which undergoes addition polymerization to form high molecular weight linear polymer, the step of adding to said monomeric material a hydropyridine selected from the group consisting of dihydropyridine, tetrahydropyridine, hydrocarbon-substituted dihydropyridine and hydrocarbon-substituted tetrahydropyridine wherein the only carbon linked to the nuclear nitrogen atom of the hydropyridine nucleus is nuclear carbon contained in the hydropyridine nucleus to said polymerizable monomeric material after addition polymerization of said polymerizable monomeric material to high molecular weight linear polymers and while unreacted polymerizable monomeric material is still present.

17. The improvement in the addition polymerization in the presence of a peroxygen polymerization catalyst of a polymerizable monomeric material consisting essentially of a polymerizable unsaturated organic compound which contains a $CH_2=C<$ group and which undergoes addition polymerization to form high molecular weight linear polymers in accordance with claim 16 wherein said hydropyridine is 2,2,4,6-tetramethyldihydropyridine.

FRANK M. McMILLAN.
EUGENE T. BISHOP.

REFERENCES CITED

The following references are of record in the file of this patent:

UNITED STATES PATENTS

| Number | Name | Date |
|---|---|---|
| 2,516,625 | Haury | July 25, 1950 |